United States Patent [19]
Oohashi et al.

[11] Patent Number: 5,157,557
[45] Date of Patent: Oct. 20, 1992

[54] MULTITRACK SYSTEM FOR PCM RECORDING AND PLAYBACK OF AUDIO SIGNALS AND SUPERSONIC WAVES

[75] Inventors: Tsutomu Oohashi; Moritada Niitsu, both of Tokyo, Japan

[73] Assignee: The Tokyo Electric Power Co., Ltd., Japan

[21] Appl. No.: 541,848

[22] Filed: Jun. 21, 1990

[30] Foreign Application Priority Data

Jun. 30, 1989 [JP] Japan ................... 1-166975

[51] Int. Cl.$^5$ ............................... G11B 5/09
[52] U.S. Cl. ...................................... 360/32
[58] Field of Search ................... 360/32, 48, 51

[56] References Cited

U.S. PATENT DOCUMENTS

| | | | |
|---|---|---|---|
| 4,646,171 | 2/1987 | OLdaka et al. ............... | 360/32 |
| 4,719,521 | 1/1988 | Juso .............................. | 360/32 |
| 4,816,926 | 3/1989 | Moriwaki et al. ............. | 360/32 |

Primary Examiner—Vincent P. Canney

Attorney, Agent, or Firm—Marger, Johnson, McCollom & Stolowitz

[57] ABSTRACT

A multitrack audio system having rotary heads by which audio signals are recorded onto a plurality of tracks and played back from the tracks on a magnetic tape comprises a track grouping circuit for dividing the tracks into track groups having the predetermined number of tracks; a type switching circuit for selecting the track groups; a first to fourth clock oscillators for generating sampling frequencies; a first circuit group which comprises a S/H circuit 15, and A/D conversion circuit, a 10-8 conversion circuit 19, and error detection/-correction code additional circuit 21, and a time axis compression circuit 23 for converting the audio signals to digital signals; a modulator; a recording and playback circuit; a demodulator; a switching circuit for selecting the track group as an object of playback; and a second circuit group, which comprises a time axis re-expansion circuit, a error detection/correction circuit, a 8-10 conversion circuit, an interpolation circuit, and D/A conversion circuits for converting the digital signals demodulated by the demodulator into audio signals selected by the switching circuit.

11 Claims, 10 Drawing Sheets

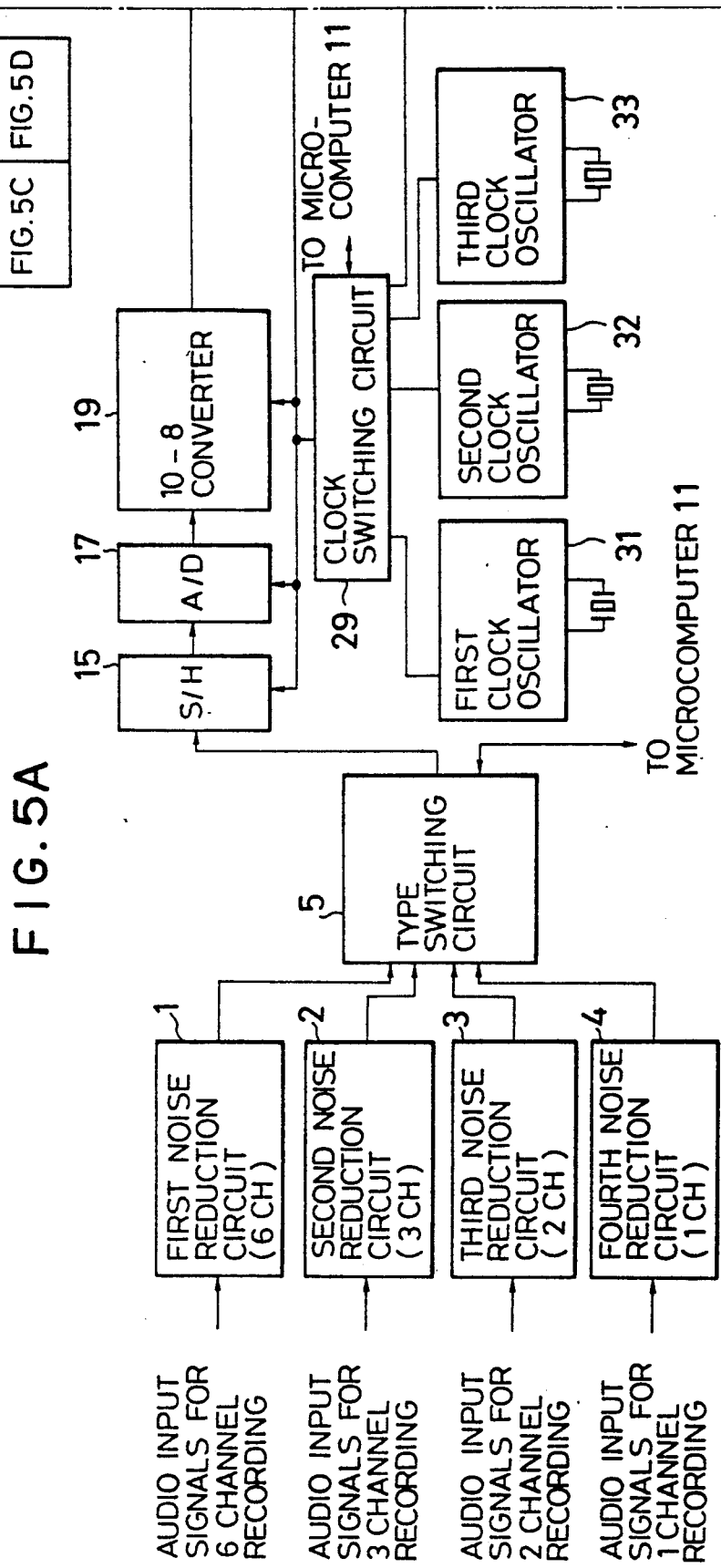

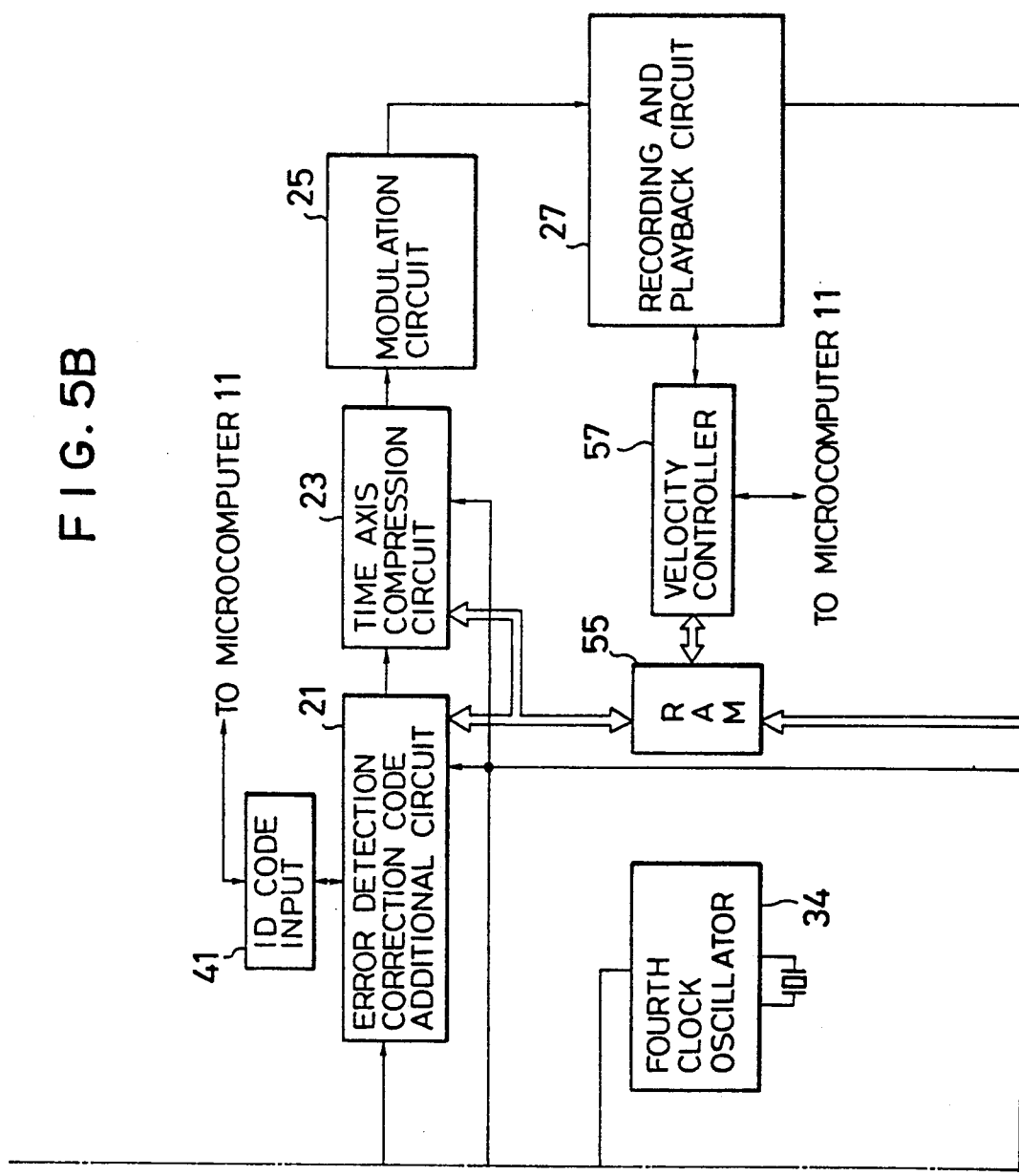
F I G. 5B

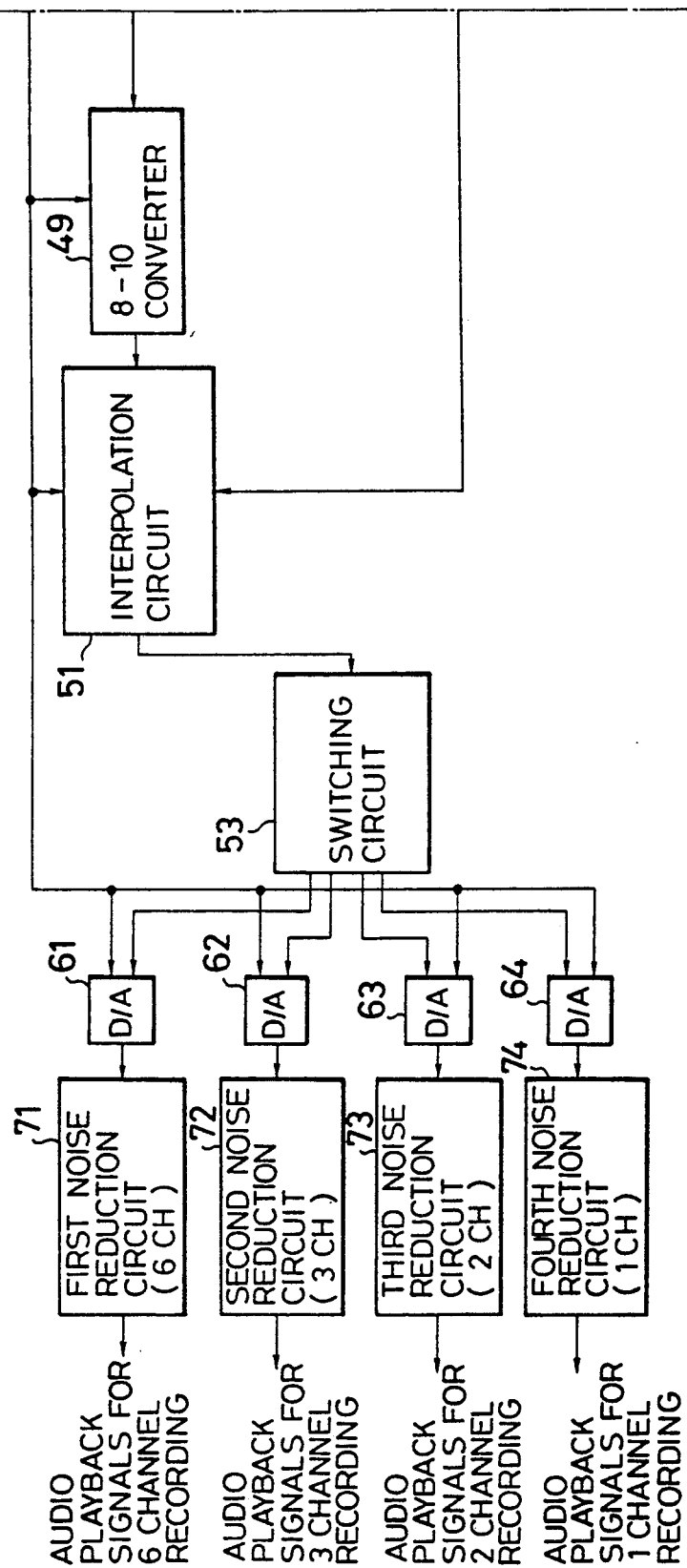

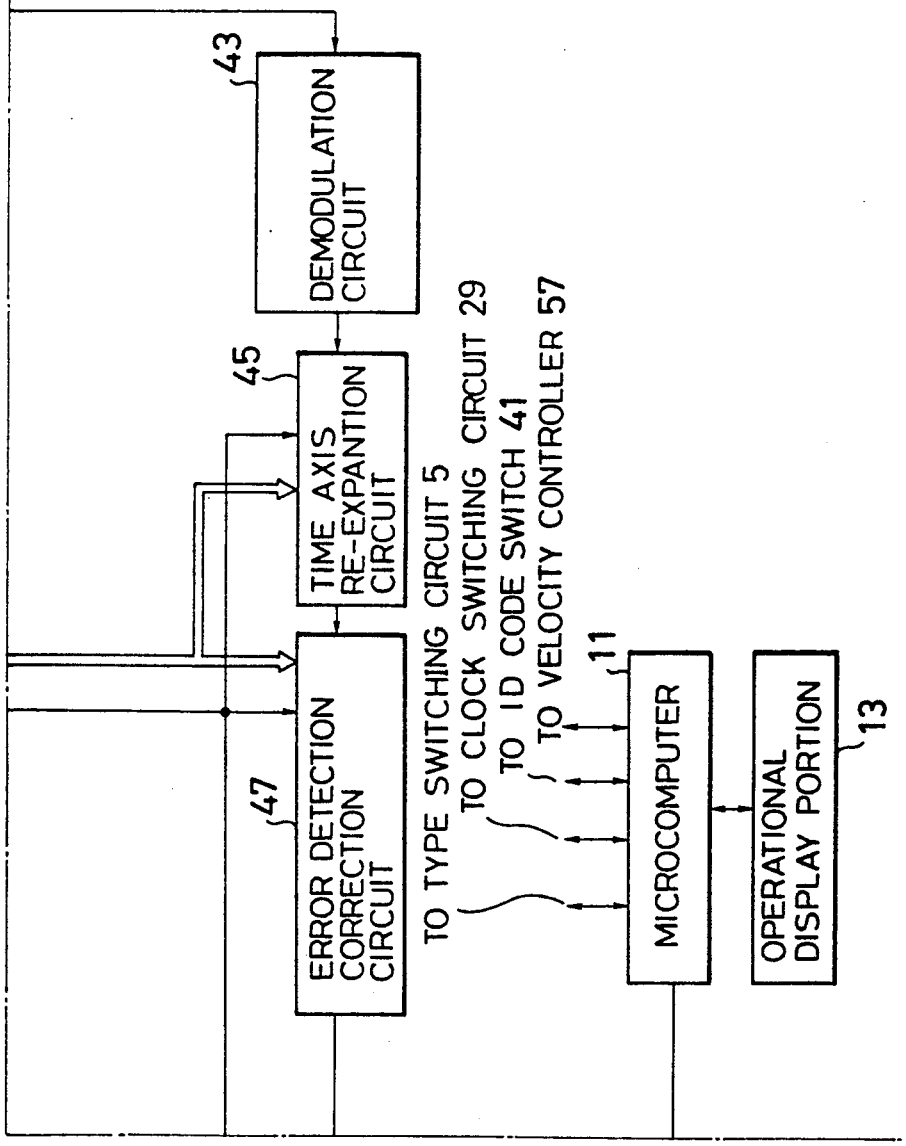

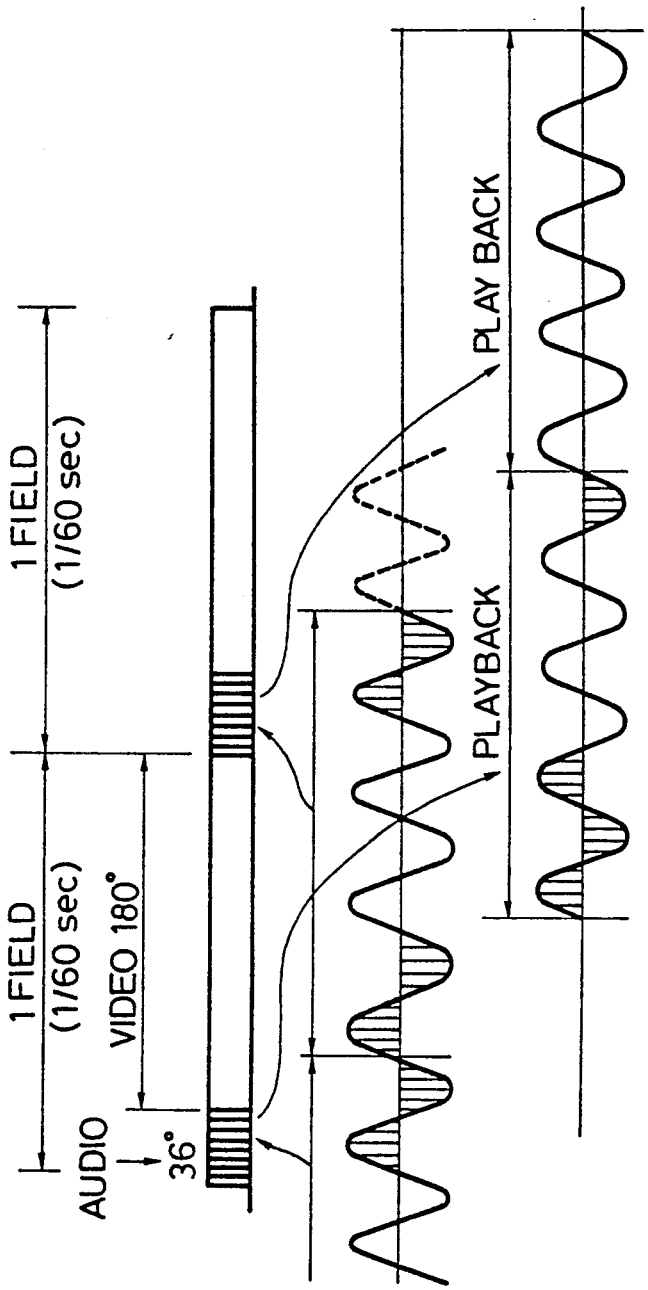

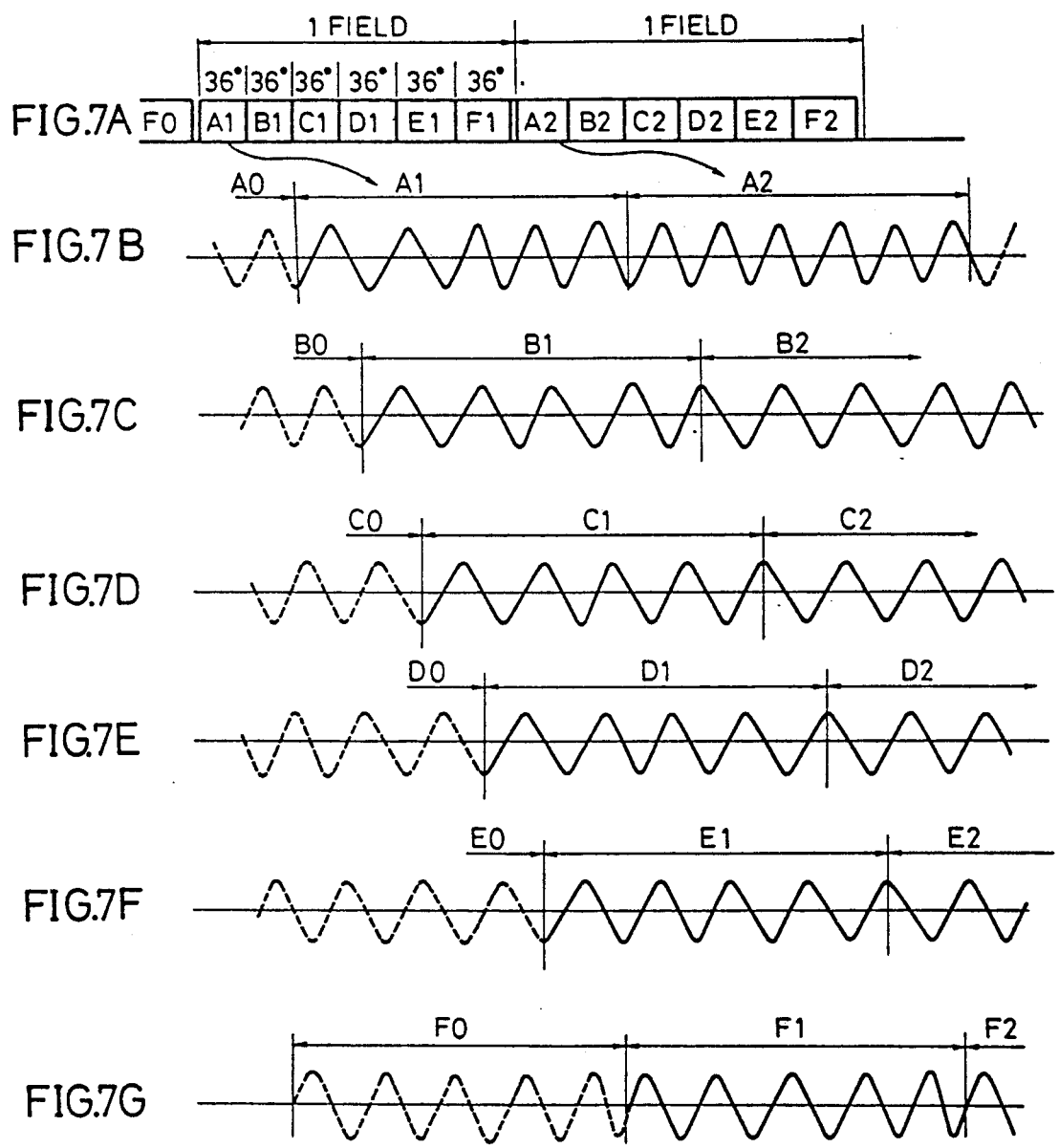

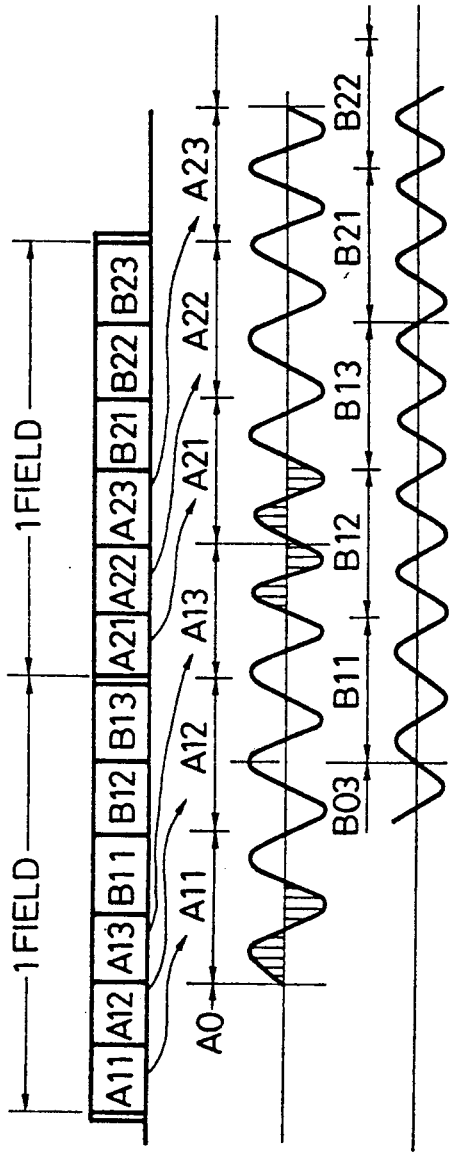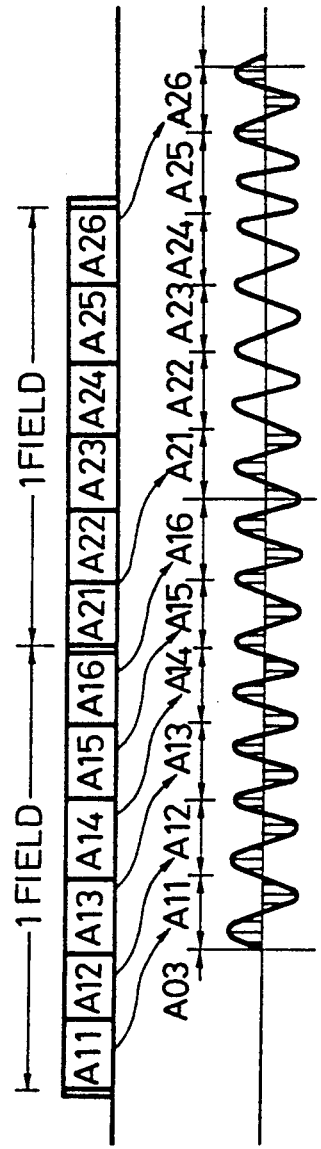
FIG. 9A
FIG. 9B
FIG. 9C
FIG. 10A
FIG. 10B

MULTITRACK SYSTEM FOR PCM RECORDING AND PLAYBACK OF AUDIO SIGNALS AND SUPERSONIC WAVES

BACKGROUND OF THE INVENTION

1. Field of the Invention

This invention relates to a multitrack audio system, more particularly to a multitrack audio system having a rotary drum head for recording/playback audio signals which are sampled by using a plurality of specified sampling frequencies, such as 31.5 kHz, 63 kHz, 94.5 kHz, and 189 kHz, and then modulated into digital signals.

2. Description of the Prior Art

As one of applications of 8-mm video system, it is well known that a 8-mm video pulse code modulation (PCM) multitrack audio system for recording PCM audio signals into video tracks has been developed.

In the PCM multi track system, a video signal area of 180 deg as a relation betwen a head of the 8-mm video and magnetic tape shown in FIG. 1 is divided into 5 areas of 36 deg each as shown in FIG. 2. PCM audio signals are recorded into the 5 areas. Namely, the audio signals are recorded into all 6 tracks as shown in FIG. 3.

In this case, the audio signals per 1/60 seconds are recorded into one field which is made of 6 tracks. The field is made of, as shown in FIG. 4, 132 blocks (block #0 to block #131) which comprises a synchronization code (3 bits), an address code (8 bits), a Q parity code (8 bits), a data (4 data×8 bits), a P parity code (8 bits), a data (4 data ×8 bits), and a CRC code (16 bits). Moreover, in the PCM multitrack system, the audio signals are sampled by the sampling frequency of 31.5 kHz for recording and then converted into PCM digital signals and then recorded onto the magnetic tape. In this case, a frequency band becomes about 15 kHz in half of the sampling frequency.

By the way, they say that it is difficult to hear sound over 20 kHz audiability by mankind. As mentioned above, it is adequate to use frequencies up to about 15 kHz for practical applications.

Sound is transmitted to the brain through the skin near ears and the skeletons of inner ears, thereby it is known that α-waves are increased in the brain of a person by hearing the sound of supersonic waves over 20 kHz.

In the conventional PCM multitrack system, for example the frequency range of about 15 kHz can be recorded and played back by using the sampling frequency of 31.5 kHz.

While, it is desired to use audio signals up to 30 kHz (twice of the frequency range of 15 kHz), 45 kHz, or 90 kHz (twice of the frequency range of 45 kHz) for increasing α-wave in the brain of a person.

SUMMARY OF THE INVENTION

This invention addresses the above mentioned problem. An object of this invention is to provide a PCM multitrack audio system for recording/playback audio signals having a super audio-frequency signal range by using a plurality of tracks of a PCM multi-track system.

To achieve the object of the invention, a multitrack audio system having rotary heads is provided by which audio signals are recorded onto a plurality of tracks and played back from the tracks on a magnetic tape. The present invention, comprises a track grouping means for dividing the tracks into track groups having the predetermined number of tracks, a first selecting means for selecting the track groups, a sampling frequency generating means for generating a sampling frequency corresponding to each of the track groups, a first conversion means for converting the audio signals sample with the sampling frequency corresponding to the track group selected by the first selecting means into digital signals, a modulation means for modulating the digital signals, a recording means for recording the digital signals onto the tracks in the magnetic tape, a readout means for reading out the digital signals recorded onto each of the tracks in the magnetic tape, a demodulation means for demodulating the digital signals read out by the readout means, a second selecting means for selecting the track group as an abject of playback, and a second conversion means for converting the digital signals demodulated by the demodulation means into audio signals selected by the second selecting means.

In the multitrack audio system according to a preferred embodiment, a plurality of the tracks for recording in a magnetic tape are divided into the predetermined number of track groups. By using sampling frequencies, such as 31.5 kHz, 63 kHz, 94.5 kHz, and 189 kHz, which are the number of tracks in the track group selected times a fundamental sampling frequency of 31.5 kHz, respectively, the audio signals are sampled and recorded onto each track. Accordingly, the multitrack audio system can record audio, signals having super audio-frequency signal range.

These and other objects, feature and advantages of the present invention will be more apparent from the following description of a preferred embodiment, taken in conjunction with the accompanying drawing.

BRIEF DESCRIPTION OF THE DRAWINGS

FIGS. 5A to 5D are block diagrams showing a multitrack audio system according to the present invention.

FIGS. 6A to 6C are diagrams to explain recording/playback format used in a conventional 8-mm multitrack video system.

FIGS. 7A to 7G are diagrams to explain a recording format of the 6 channel recording/playback operation with the sampling frequency of 31.5 kHz used in the multitrack audio system as shown in FIGS. 5A to 5D.

FIGS. 9A to 9C are diagrams to explain a recording format of the 2 channel recording/playback operation with the sampling frequency of 94.5 kHz used in the multitrack audio system as shown in FIGS. 5A to 5D.

FIGS. 10A to 10B are diagrams to explain a recording format of the 1 channel recording/playback operation by the sampling frequency of 189 kHz used in the multitrack audio system as shown in FIGS. 5A to 5D.

DETAILED DESCRIPTION OF THE ENBODIMENT

Figure 1:
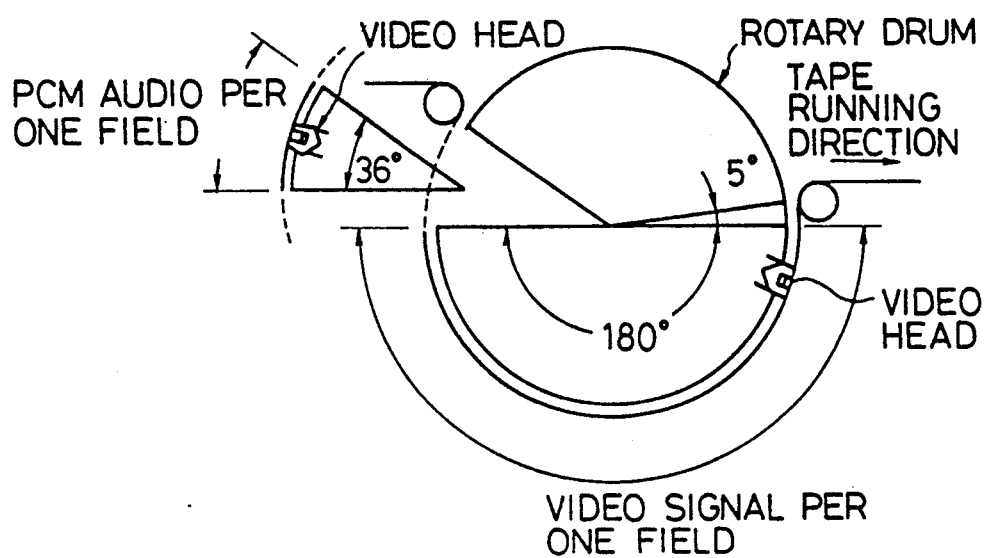
FIG. 1 is a diagram to explain a relation between heads used in a conventional 8-mm video system and a magnetic tape used therein.
Figure 2:
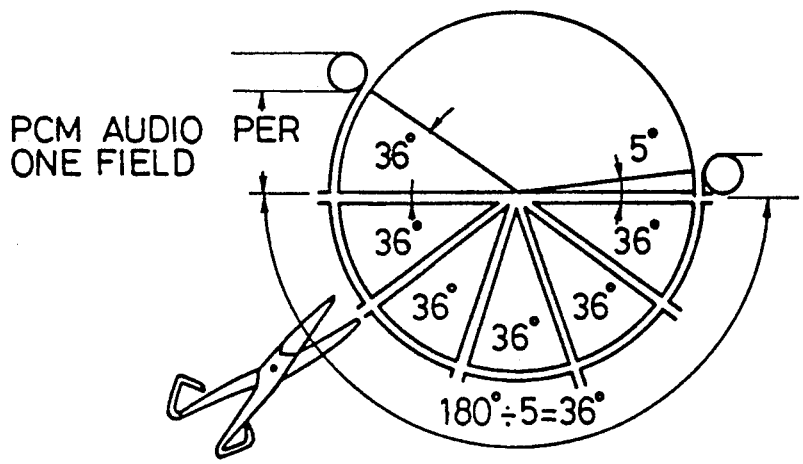
FIG. 2 is a diagram to explain the 5 divided areas for video signals to be recorded in the magnetic tape as shown in FIG. 1.

Hereinafter, an embodiment of a multitrack audio system according to the invention will now be described with reference to the drawings.

FIGS. 5A to 5D are a block diagram showing a composition of the multitrack audio system.

The multitrack audio system as shown in FIGS. 5A to 5D performs a recording/playback operation for audio signals having a super audio-frequency signal range (having wide frequency bandwith) obtained by using all 6 tracks which are used for recording video signals and audio signals on a magnetic tape in a conventional PCM multitrack system.

More specifically, in the multitrack audio system according to the embodiment, as first operation, the audio signals are sampled by using a sampling frequency of 31.5 kHz, then recorded into one track per one channel as recording areas on a magnetic tape, just as used in the conventional PCM multitrack system. Thereby, a 6 channel recording/playback operation (using a sampling frequency of 31.5 kHz/about 15 kHz frequency bandwidth) is the first operation for the recording/playback system.

Next, as a second operation, the 6 tracks in the magnetic tape are divided into 3 track groups which comprise 2 tracks, respectively. Moreover, the audio signals are sampled by using a sampling frequency of 63 kHz, then recorded into 2 tracks per one channel as recording areas on a magnetic tape. Thereby, a 3 channel recording/playback operation (using a sampling frequency of 63 kHz/about 30 kHz frequency bandwidth) as the second operation for the recording/playback system.

Next, as a third operation, the 6 tracks in the magnetic tape are divided into 2 track groups which comprise 3 tracks, respectively. Moreover, the audio signals are sampled by using a sampling frequency of 94.5 kHz, then recorded into 3 tracks per one channel as recording areas on a magnetic tape. Thereby, a 2 channel recording/playback operation (using a sampling frequency of 94.5 kHz/about 45 kHz frequency bandwidth) as the third operation for the recording/playback system.

Finally, as a fourth operation, the 6 tracks in the magnetic tape are divided into one track group which comprise 6 tracks. Moreover, the audio signals are sampled by using a sampling frequency of 189 kHz, the recorded into 6 tracks as recording areas on a magnetic tape. Thereby, a one channel recording/playback operation (using sampling frequency of 189 kHz/about 90 kHz frequency bandwith) is the fourth operation for the recording/playback system.

To summarize the above operations, it will be described as the following items (a) to (d).

(a) The 6 channel recording/playback operation as the first operation.

The sampling frequency . . . 31.5 kHz,
The frequency range . . . 15 kHz,
The 6 track groups (include 1 track each).

(b) The 3 channel recording/playback operation as the second operation.

The sampling frequency . . . 63 kHz,
The frequency range . . . 30 kHz,
The 3 track groups (include 2 tracks each).

(c) The 2 channel recording/playback operation as the third operation.

The sampling frequency . . . 94.5 kHz,
The frequency range . . . 45 kHz,
The 2 track groups (include 3 tracks each).

(d) The 1 channel recording/playback operation as the fourth operation.

The sampling frequency . . . 189 kHz,
The frequency range . . . 90 kHz,
The 1 track group (includes 6 tracks).

The multitrack audio system according to the embodiment as shown in FIGS. 5A to 5D comprise first to a fourth noise reduction circuits (reference numbers 1 to 4 in the FIGS. 5A to 5D respectively) to which the audio signals for recording are input for the four operations, as above mentioned.

The audio signals output from each of the noise reduction circuits 1 to 4 are provided into a type switching circuit 5 serving as a first selecting means. In the type switching circuit 5, the audio signals output from one of the noise reduction circuits 1 to 4 is selected by a selection signal output from a microcomputer 11. Furthermore, an operational display 13 used for indications of various operations is connected to the microcomputer 11. The selection signal input from an outer portion (not shown) decides which one of the operations (a) to (d) is provided into the type switching circuit 5 through the operational display 13 of the computer 11. Thus, the audio signals output from one of the noise reduction circuits 1 to 4 is selected by the type switching circuit 5.

Next, the audio signals selected by the type switching circuit 5 are provided into a recording/playback circuit 27 (as a recording means and a readout means) through a first circuit group as a first conversion means and a modulation circuit 25. The first circuit group comprises a sample/hold (S/H) circuit 15, an analog/digital (A/D) conversion circuit 17, a 10 bit to 8 bit (10-8) conversion circuit 19, an error detection/correction code additional circuit 21, and a time axis compression circuit 23 which are controlled in order by clock oscillator circuits 31 to 34. Then the audio signals are recorded onto a magnetic tape, such as a 8-mm magnetic tape for recording, through the recording/playback circuit 27.

In the recording, the tracks for the recording and playback on the magnetic tape are grouped by the velocity control portion 57 and recording/playback circuit as a track grouping means executed in accordance with the first operation to the fourth operation as above described.

In the multitrack audio system of the embodiment, the S/H circuit 15 has a feature by which the maximum sampling frequency of 189 kHz can be used for recording and playback.

Clock signals for the sampling frequencies according to each of the recording/playback operations (step 1 to step 4) are provided into all of the first circuit group from the clock oscillator 31 to 34 through a clock switching circuit 29. Moreover, a clock switching signal output from the microcomputer 11 is input into the clock switching circuit 29.

Namely, when the audio signals for the 6 channel recording/playback operation as the first step are selected by the type switching circuit 5, the audio signals are input into the S/H circuit 15 through the first noise reduction circuit 1. At this time, the sampling frequency of 31.5 kHz as a first clock signal is provided into the first circuit group through the clock switching circuit 29 from the first clock oscillator 31 under the control of microcomputer 11.

Moreover, when the audio signals for the 3 channel recording/playback operation as the second step are selected by the type switching circuit 5, the audio signals are input into the S/H circuit 15 through the second noise reduction circuit 2. At this time, the sampling frequency of 63 kHz as a second clock signal is provided into the first circuit group through the clock switching circuit 29 from the second clock oscillator 32 under the control of microcomputer 11.

Furthermore, when the audio signals for the 2 channel recording/playback operation as the third step are selected by the type switching circuit 5, the audio signals are input into the S/H circuit 15 through the third noise reduction circuit 3. At this time, the sampling frequency of 94.5 kHz as a third clock signal is provided into the first circuit group through the clock switching circuit 29 from the third clock oscillator circuit 33. The sampling frequency of 94.5 kHz is provided from the third clock oscillator 33 into the first circuit group through the clock switching circuit 29 under the control of the microcomputer 11.

In addition, when the audio signals for the 1 channel recording/playback operation as the fourth step is selected through the fourth noise reduction circuit 4, the sampling frequency of 189 kHz is provided into the first circuit group from the fourth clock oscillator circuit 34 through the clock switching circuit 29.

Accordingly, the audio signal input for recording are sampled at the sampling frequency, then are converted into digital signals and finally converted into compression signals by a 10-8 (10 bits to 8 bits) conversion operation executed in the 10-8 conversion circuit 19.

In the 10-8 conversion operation, a 10 bit digital signal quantized by the A/D convertor 17 is compressed into a 8 bit digital signal. For, example, levels 0 to 15 of the 10-bit quatization are not compressed and levels 16 to 63 of the 10-bit quantization are converted into levels 16 to 39 of the 8 bit quantization. Thereby, smaller quantity signals which are affected easier by noise are precisely encoded and larger quantity signals are roughly encoded so that a S/N ratio of the compressed digital signals (8 bits) almost equals that of 10 bit digital signals.

The digital signals converted by the 10-8 conversion circuit 19 are given error correction codes by the error detection correction code additional circuit 21 and the time axis of the digital signals is compressed at the time axis compression circuit 23. Next, the digital signals are modulated by the modulation circuit 25 and finally are recorded onto the magnetic tape through the recording/playback circuit 27. In addition, and ID code is input to the error detection correction additional circuit 21 under the control of the microcomputer 11.

The error detection correction additional circuit 21 and the time axis compression circuit 23 connect to a random access memory (RAM) 55. The RAM 55 is connected to a velocity control portion 57. A rotary drum-type head, ATF, a drum servo, and a capstan servo control which constitute the recording/playback circuit 27 are performed under the velocity control portion 57.

Next the digital signals recorded on the magnetic tape are read out by the recording/playback circuit 27 under the control of the velocity control circuit 57, and then demodulated at a demodulation circuit 43. The digital signals demodulated by the demodulation circuit 43 are converted into analog signals through a second circuit group as a second conversion means. The second circuit group comprises the time axis re-expansion circuit 45, the error detection correction circuit 47, a 8-10 (8 bits to 10 bits) conversion circuit 49, an interpolation circuit 51, and digital to analog (D/A) conversion circuits 61 to 64.

Namely, the digital signals are re-expanded along the time axis by a time axis re-expansion circuit 45, then detected and corrected by the error detection/correction circuit 47, then converted to 10 bit digital signals at a 8-10 conversion circuit 49. Next, the digital signals are interpolated by an interpolation circuit 51. One of the digital to analog (D/A) conversion circuits 61 to 64 is selected by a switching circuit 53 which serves as a second selecting means according to the first step to fourth step of the recording/playback operation as above mentioned.

Accordingly, the audio signals for playback are output from one of noise reduction circuits 71 to 74 according to the D/A conversion circuit (61 to 64) selected by the switching circuit 53. By the way, the error detection/correction circuit 47 and the time axis re-expansion circuit 45 connect to RAM 55. The error detection/correction operation and the re-expansion operation along the time axis are performed by using the RAM 55. The microcomputer 11 is connected to the type switching circuit 5, the clock switching circuit 29, the ID code input circuit 41, the velocity control portion 57, and the interpolation circuit 51. The type switching operation for the recording/playback operation, the clock switching operation, and the velocity control operation are executed under the control of the microcomputer 11.

Next operations of the multitrack audio system having the above mentioned composition will now be described referring to the FIGS. 6A to 6C.

FIGS. 6A to 6C are diagrams to explain the recording of video signals on 8-mm video. As shown in FIG. 6A, video signals per one field which are sampled and compressed with the sampling frequency of 31.5 kHz are recorded in an area of 180 deg in one field of 1/60 seconds and right and left channel audio signals are recorded onto an area of 36 deg. FIG. 6C is the diagram to explain the playback of the video signals and the right and left channel audio signals which have been already recorded.

Figure 3:
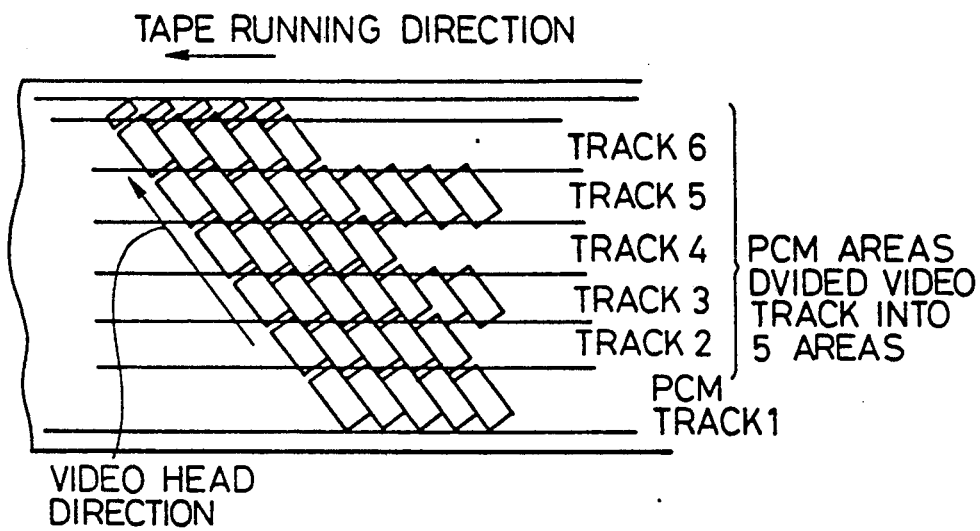
FIG. 3 is a diagram to explain a multitrack used in a PCM multitrack system.
Figure 4:
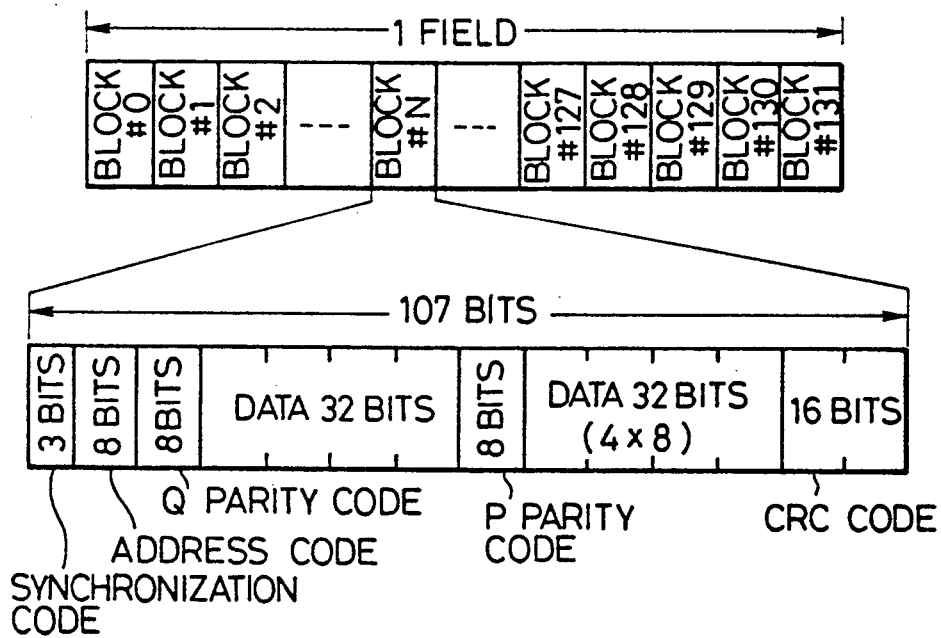
FIG. 4 is a diagram showing a data structure per one field used in a PCM multitrack system.

In the multitrack audio system according to the embodiment, when the 6 channel recording/playback operation of the first step is performed, the 6 tracks per one field as shown in FIG. 3 are divided into the 6 track groups which comprise 1 track each. Next audio signals A1, B1, C1, D1, E1, and F1 are recorded in the 6 track groups as shown in FIGS. 7A to 7G.

When the playback operation is performed, the audio signals A1, B1, C1, D1, E1, and F1 are read out as shown in FIGS. 7A to 7G. And another audio signals, for example A2, B2, C2, D2, E2, and F2 also are read out likewise.

Namely, when the 6 channel recording/playback operation of the first step is designated by the operational display portion 13, the type switching circuit 5, the clock switching circuit 29, the ID code input circuit 41, and the velocity control portion 57 are controlled under the microcomputer 11 suquentially. In this operation, the audio signals are input into the type switching circuit 5 through the first noise reduction circuit 1. The clock signal of the sampling frequency of 31.5 kHz is provided to the first circuit group, which comprise the S/H circuit 15, the A/D conversion circuit 17, the 10-8 conversion circuit 19, the error detection/correction code additional circuit 21, the time axis compression circuit 23, and the modulation circuit 25, by the clock switching circuit 29.

Accordingly, the audio signals are sampled by the S/H circuit 15 with the sampling frequency of 31.5 kHz through the first noise reduction circuit 1 and the type switching circuit 5, then the 10-8 conversion operation is performed by the 10-8 conversion circuit 19. Next, the digital signals of the converted audio signals are processed by the error detection and correction operation at the error detection/correction additional circuit 21, then compressed by the time axis compression circuit 23. Finally, the audio signals are processed by the frequency modulation (FM) operation at the modulation circuit 27, then recorded onto each of the tracks, such as A1, B1, C1, D1, E1 and F1 as shown in FIGS. 7A to 7G through the recording/playback circuit 27.

When the playback operation is performed, the audio signals recorded on the magnetic tape as mentioned above are read out by the recording/playback circuit 27, then demodulated by the demodulation circuit 43, and re-expanded along the time axis by the time axis re-expansion circuit 45. Next the audio signals are detected and corrected by the error detection correction circuit 47, then interpolated by the interpolation circuit 51. Next, the audio signals are converted to analog signals by the first D/A convertion circuit 61 according to the 6 channel recording/playback operation. Finally, the audio signals of the analog signals are output through the first noise reduction circuit 71. Moreover, the audio signals played back in the above mentioned operation have a frequency band width of about 15 kHz just as it is used in the conventional PCM multitrack system.

Figures 8A, 8B, 8C, 8D:
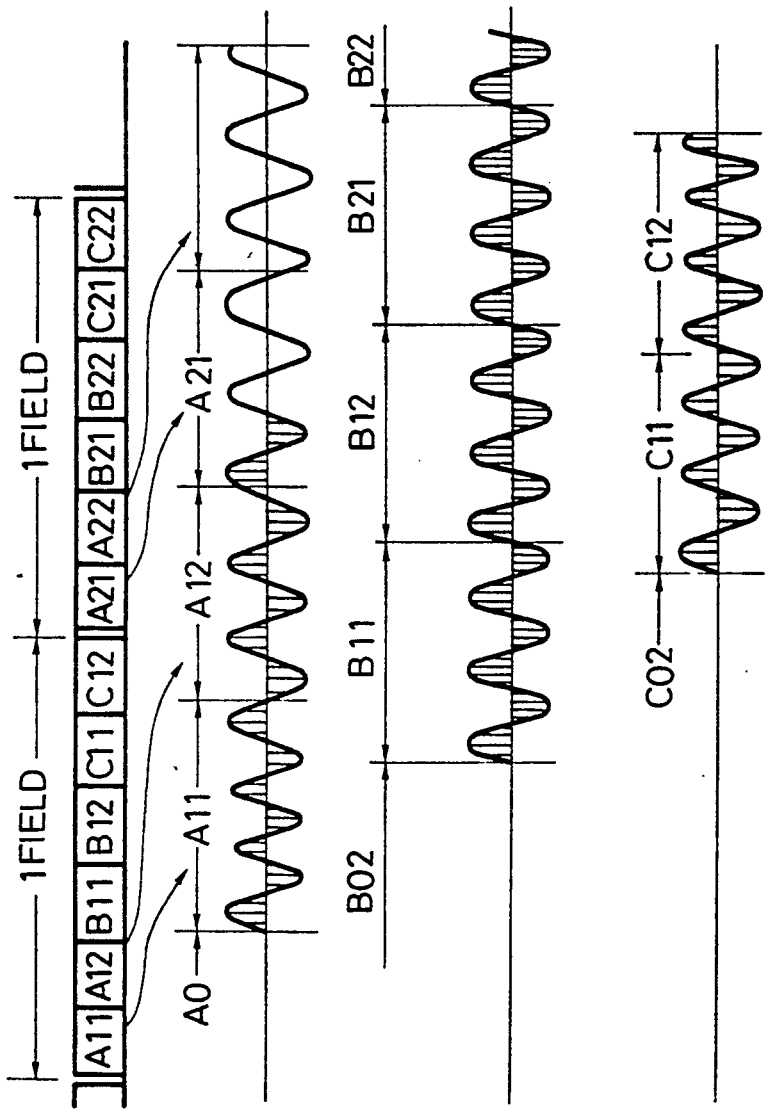
FIGS. 8A to 8D are diagrams to explain a recording format of the 3 channel recording/playback operation with the sampling frequency of 63 kHz used in the multitrack audio system as shown in FIGS. 5A to 5D.

Next, the 3 channel recording/playback operation of the second step will be described below in detail. When the 3 channel recording/playback operation is selected through the operational display 13, the 6 tracks per one field are divided into 3 groups which comprise 2 tracks, respectively, such as A11 and A12, B11 and B12, C11 and C12 as shown in FIG. 8A. The audio signals sampled by the sampling frequency of 63 kHz are recorded in the area of each track group. In this sampling operation, the clock signal at the sampling frequency of 63 kHz output from the second clock oscillator 32 is selected through the clock switching circuit 29 under the control of the microcomputer 11.

The clock signal of 63 kHz is provided into the S/H circuit 15. Next, the audio signals output from the second noise reduction circuit 2 are selected through the type switching circuit 5, then sampled with the clock signal of 63 kHz at the S/H circuit 15. The audio signals sampled by the S/H circuit 15 are recorded onto each of the track groups of the magnetic tape through the A/D conversion circuit 17, the 10-8 conversion circuit 19, the error detection/correction additional circuit 23, the time axis compression circuit 23, the modulation circuit 25, and the recording and playback circuit 27 in order.

In this case, the audio signals with the frequency bandwith of about 30 kHz are recorded onto each of the track groups. Namely, the audio signals sampled with the clock signal of 63 kHz as the sampling frequency are recorded into each of the tracks.

When the playback operation is performed, the audio signals recorded onto the magnetic tape are read out by the recording/playback circuit 27, then demodulated by the demodulation circuit 43. Moreover, the audio signals are re-expanded by the time axis re-expansion circuit 45. In the error detection and correction circuit 47, the error detection and correction operation is performed for the audio signals. Next, the audio signals are converted to audio signals of 10 bits by the 8-10 conversion operation.

The audio signals converted are interpolated by the interpolation circuit 51, then played back as shown in FIGS. 8A to 8D.

The audio signals played back in the above mentioned operation have the frequency bandwith of about 30 kHz which is twice as high as the sampling frequency used in the conventional PCM multitrack system because they are sampled at the sampling frequency of 63 kHz.

When the 2 channel recording/playback operation is selected by the operational display portion 13, the 6 tracks per one field are divided into the 2 track groups which comprise 3 tracks, respectively, such as (A11, A12, and A13), and (B11, B12, and B13) as shown in FIGS. 9A to 9C.

The clock signal of the sampling frequency of 94.5 kHz output from the third clock oscillator 33 is selected through the clock switching circuit 29 under the control by the microcomputer 11. Thereby, the sampling frequency of 94.5 kHz is provided into the S/H circuit 15. Thereby, the audio signals output from the third noise reduction circuit 3 are selected, then sampled with the clock signal of 94.5 kHz used as the sampling frequency by the S/H circuit 15 The audio signals sampled by the S/H circuit 15 are recorded onto each of the track groups of the magnetic tape, for example (A11, A12, and A13) as shown in FIG. 9A, through the A/D conversion circuit 17, the 10-8 conversion circuit 19, the error detection correction additional circuit 21, the time axis compression circuit 23, the conversion circuit 25, and recording/playback circuit 27 in order.

In this case, the audio signals within the frequency bandwith of about 45 kHz are recorded onto each of the track groups. Namely, the audio signals sampled with the clock signal of 94.5 kHz as the sampling frequency are recorded into each of the tracks.

When the playback operation is performed, the audio signals recorded onto the magnetic tape are read out by the recording/playback circuit 27, then demodulated by the demodulation circuit 43. Moreover, the audio signals are re-expanded by the time-axis re-expansion circuit 45. In the error detection and correction circuit 47, the error detection and correction operation is performed on the audio signals. Next, the audio signals are converted to audio signals of 10 bits by the 8-10 conversion circuit 49. The audio signals converted are interpolated by the interpolation circuit 51, then played back as shown in FIGS. 9A to 9C.

Moreover, when the 1 channel recording/playback operation is selected by the operational display portion 13, the 6 tracks per one field are grouped into the 1 track group, such as (A11,A12,A13,A14,A15, and A16), as shown in FIGS. 10A and 10B. In addition, the clock signal of the sampling frequency of 189 kHz output from the fourth clock oscillator 34 is selected through the clock switching circuit 29 under the control of the microcomputer 11. Next, the sampling frequency of 189 kHz is provided into the S/H circuit 15. The audio signals output from the fourth noise reduction circuit 4 thereby is selected, then sampled using the clock signal of 189 kHz as the sampling frequency by the S/H circuit 15. The audio signals sampled by the S/H circuit 15 are recorded into the track group of the magnetic tape, such as A11,A12,A13,A14,A15 and A16 through the A/D conversion circuit 17, the 10–8 conversion circuit 19, the error detection correction additional circuit 21, the time axis compression circuit 23, the conversion circuit 25, and recording/playback circuit 27 in order.

In this case, the audio signals within the frequency bandwith of about 90 kHz are recorded onto each of the track groups. Namely, the audio signals sampled with the clock signal of 189 kHz as the sampling frequency are recorded into the track.

When the playback operation is performed, the audio signals recorded onto the magnetic tape are read out by the recording/playback circuit 27, then demodulated by the demodulation circuit 43. Moreover, the audio signals are re-expanded by the time-axis re-expansion circuit 45. In the error detection and correction circuit 47, the error detection and correction operation is performed for the audio signals. Next, the audio signals are converted to audio signals of 10 bits by the 8–10 conversion circuit 49. The audio signals converted are interpolated by the interpolation circuit 51. Then, the audio signals are played back as shown in FIG. 10B through the D/A conversion circuit, which is selected by the switching circuit 53 according to the fourth recording and playback operation, and the fourth noise reduction circuit.

Accordingly, as compared to the frequency bandwith obtained by the first 6 channel recording and playback operation or the conventional PCM multi-track audio system, the frequency bandwith obtained by the fourth 1 channel recording and playback operation has a bandwith about six times as wide as the frequency bandwith of the first 6 channel recording and playback operation or the conventional PCM multi-track audio system, about three times as wide as the frequency bandwith of the second 3 channel recording and playback operation, and about two times as wide as the frequency bandwith of the the third 2 channel recording and playback operation.

Various modifications will become possible for those skilled in the art after receiving the teaching of the present disclosure without departing from the scope thereof.

What is claimed is:

1. A multitrack audio system having rotary heads by which audio signals are recorded onto a plurality of tracks and played back from the tracks on a magnetic tape, comprising:
    a track grouping means for dividing the tracks into track groups having a predetermined number of tracks;
    a sampling frequency generating means for generating a sampling frequency corresponding to each of the track groups;
    a first selecting means for selecting the track groups including means for changing the number of track groups and the number of tracks comprising a track group in correspondence to the sampling frequency;
    a first conversion means for converting the audio signals sampled with the sampling frequency corresponding to the track group selected by the first selecting means into digital signals;
    a modulation means for modulating the digital signals;
    a recording means for recording the digital signals onto the tracks in the magnetic tape;
    a readout means for reading out the digital signals recorded on each of the tracks in the magnetic tape;
    a demodulation means for demodulating the digital signals read out by the readout means;
    a second selecting means for selecting the track group read out by the readout means; and
    a second conversion means for converting the digital signals demodulated by the demodulation means on the track group selected by the second selecting means into audio signals.

2. The multitrack audio system according to claim 1, wherein the fundamental sampling frequency is a frequency of 31.5 kHz.

3. The multitrack audio system according to claim 1, wherein a number of the track groups is four and the number of tracks in each of the track groups is 6 tracks, 3 tracks, 2 tracks, and 1 track, respectively.

4. The multitrack audio system according to claim 1, wherein the number of sampling frequency generating means is four and each of the sampling frequency generating means generates a frequency of 31.5 kHz, 63 kHz, 94.5 kHz, and 189 kHz, respectively.

5. The multitrack audio system according to claim 1, wherein each of the sampling frequency is the tracks in the track group selected by the first selecting means times as high as a fundamental sampling frequency.

6. The multitrack audio system according to claim 1, wherein the first selecting means and the second selecting means are controlled by a microcomputer.

7. A multitrack audio signal recording and playback method for recording and playback audio signals on a plurality of tracks in a magnetic tape, comprising:
    dividing the tracks into track groups having the predetermined number of tracks by a track grouping means;
    selecting the track groups by a first selecting means;
    generating a sampling frequency corresponding to each of the track groups by a sampling frequency generating means;
    converting the audio signals sampled with the sampling frequency corresponding to the track group selected by the first selecting means into digital signals by a first conversion means;
    modulating the digital signals by a modulation means;
    recording the digital signals onto the tracks in the magnetic tape by a recording means;
    reading out the digital signals recorded onto each of the tracks in the magnetic tape by a readout means;
    demodulating the digital signals read out by the readout means by a demodulation means;
    selecting the track group as an object of playback by a second selecting means;
    converting the digital signals demodulated by the demodulation means into audio signals selected by the second selecting means by a second conversion means; and
    changing the number of track groups and the number of tracks comprising a track group responsive to the sampling frequency.

8. The multitrack audio signal recording and playback method according to claim 7, wherein the sampling frequencies of 31.5 kHz, 63 kHz, 94.5 kHz, and 189 kHz are generated by the step for generating the sampling frequency.

9. A PCM recording and playback system for audio signals and supersonic waves by which audio signals and supersonic wave are recorded on a magnetic tape by a rotary head on a slant recording area and played back from the slant recording area on the magnetic tape, comprising:

fundamental sampling frequency generating means for generating a fundamental sampling frequency "fb";

selecting means for selecting a required sampling frequency being "n" times of the fundamental sampling frequency "fb" (where "n" is a positive integer and the result of multiplication of "n" and other positive integer is six);

track grouping means for dividing the slant recording area into "n" number areas, each area is the same in length, according to the selected sampling frequency, and for grouping the "n" areas into 6/n track groups (channels);

sampling frequency generating means for generating the sampling frequency having the frequency of "fs" ($=n\times$"fb") selected by the selecting means;

first conversion means for converting the audio signals and supersonic wave sampled with the sampling frequency "fs" corresponding to the track group selected by the selecting means into digital signals;

modulation means for modulating the digital signals;

recording means for recording the digital signals onto the slant recording area on the magnetic tape;

readout means for reading out the digital signals from the slant recording area on the magnetic tape by using the selected sampling frequency "fb";

demodulation means for demodulating the digital signals read out by the readout means; and second conversion means for converting the digital signals demodulated by the demodulation means into audio signals.

10. A PCM recording and playback system according to claim 9, wherein the fundamental sampling frequency is 31.5 kHz.

11. A PCM recording and playback method for recording and playback audio signals and supersonic wave by which audio signals and supersonic wave are recorded on a magnetic tape by a rotary head on a slant recording area and played back from the slant recording area on the magnetic tape, comprising the steps of:

generating a fundamental sampling frequency "fb";

selecting a required sampling frequency being "n" times of the fundamental sampling frequency "fb" kHz (where "n" is a positive integer and the result of multiplication of "n" and other positive integer is six);

dividing the slant recording area into "n" number areas, each area being same in length, according to the selected sampling frequency, and for grouping the "n" number areas into 6/n track groups (channels);

generating the sampling frequency having the frequency of "fs"$=n\times$"fb" selected by the selecting step:

converting the audio signals sampled with the sampling frequency "fs" corresponding to the track group selected by the selecting step into digital signals;

modulating the digital signals;

recording the digital signals onto the slant recording area on the magnetic tape;

reading out the digital signals from the slant recording area on the magnetic tape by using the selected sampling frequency "fb";

demodulating the digital signals read out by the readout step; and converting the digital signals demodulated by the demodulation step into audio signals.

* * * * *